Feb. 28, 1967 L. G. KILMER 3,306,392
HYDRAULIC SYSTEM FOR SEISMIC CARRIER VEHICLE
Filed June 8, 1964 5 Sheets-Sheet 1

INVENTOR.
LAUREN G. KILMER
BY *McLean and Boustead*
ATTORNEYS

Feb. 28, 1967     L. G. KILMER     3,306,392
HYDRAULIC SYSTEM FOR SEISMIC CARRIER VEHICLE
Filed June 8, 1964                                5 Sheets-Sheet 2
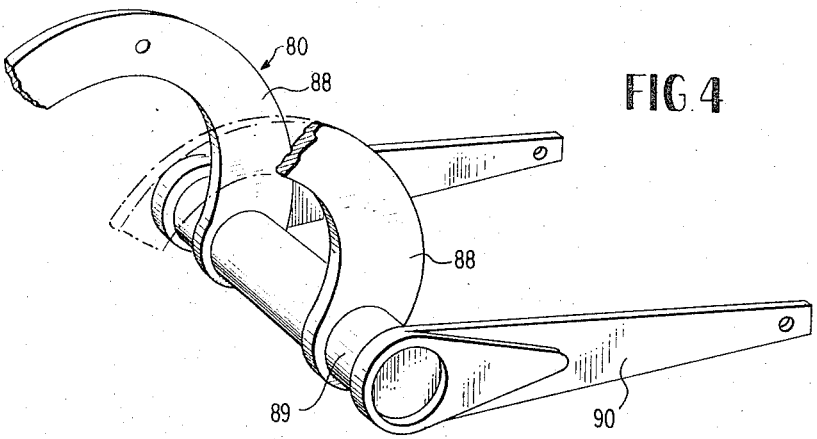
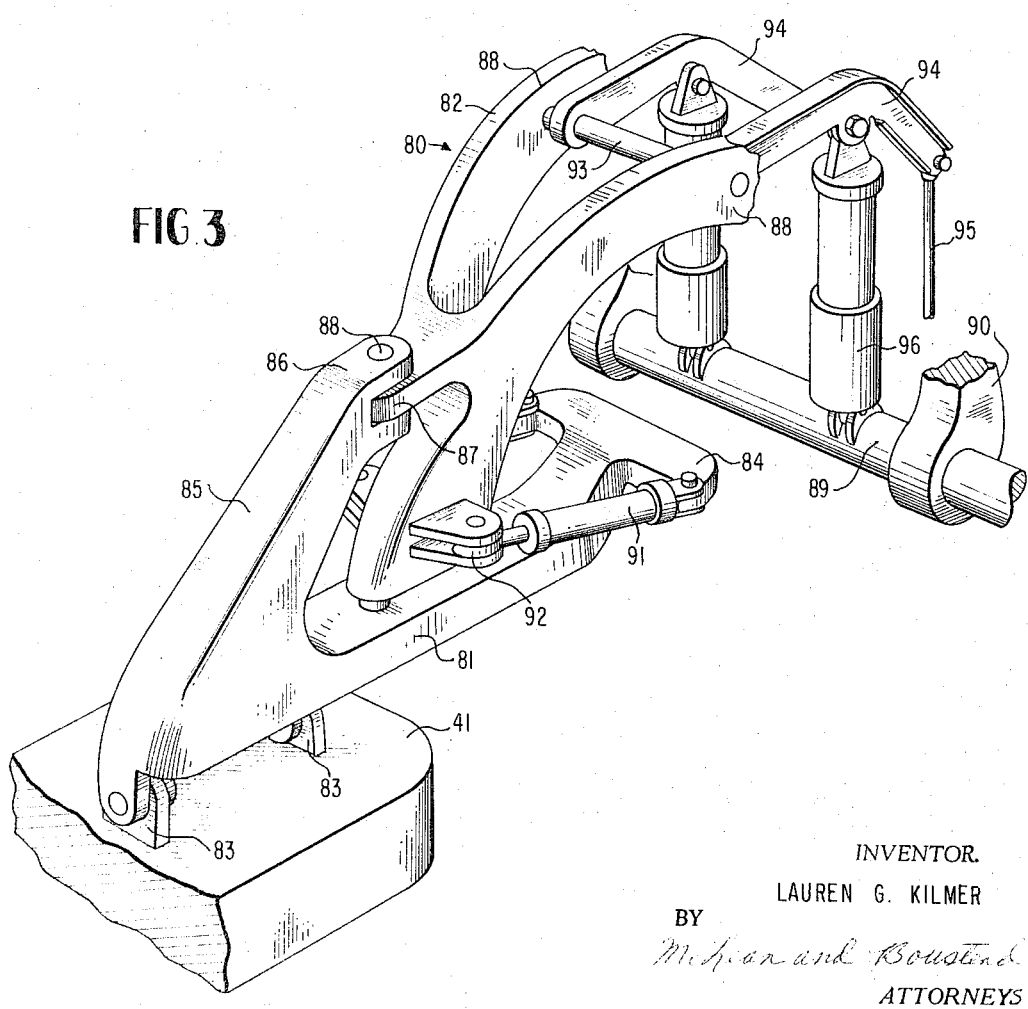
INVENTOR.
LAUREN G. KILMER
BY
*McLean and Bousted*
ATTORNEYS

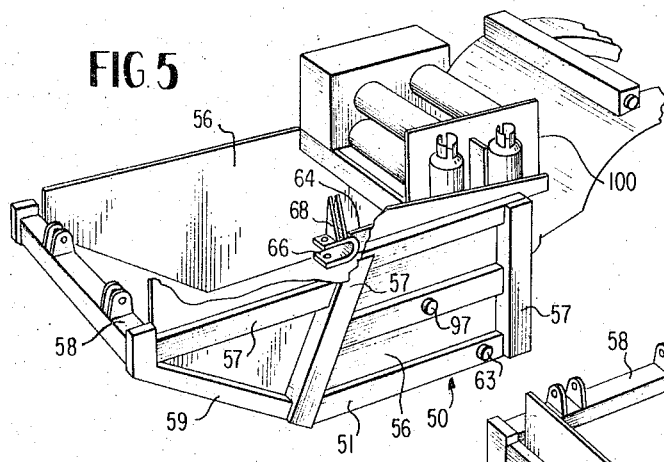
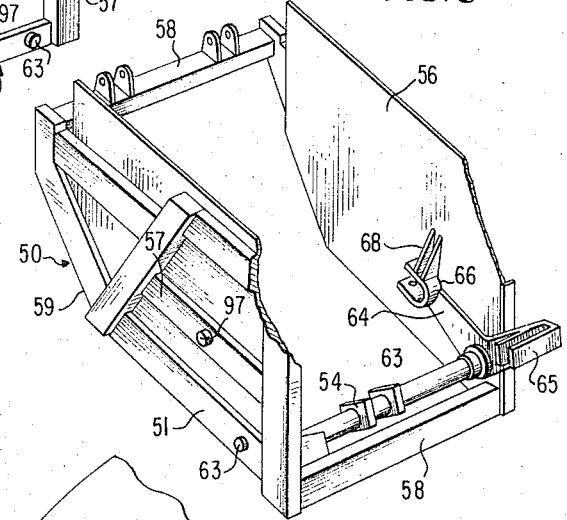
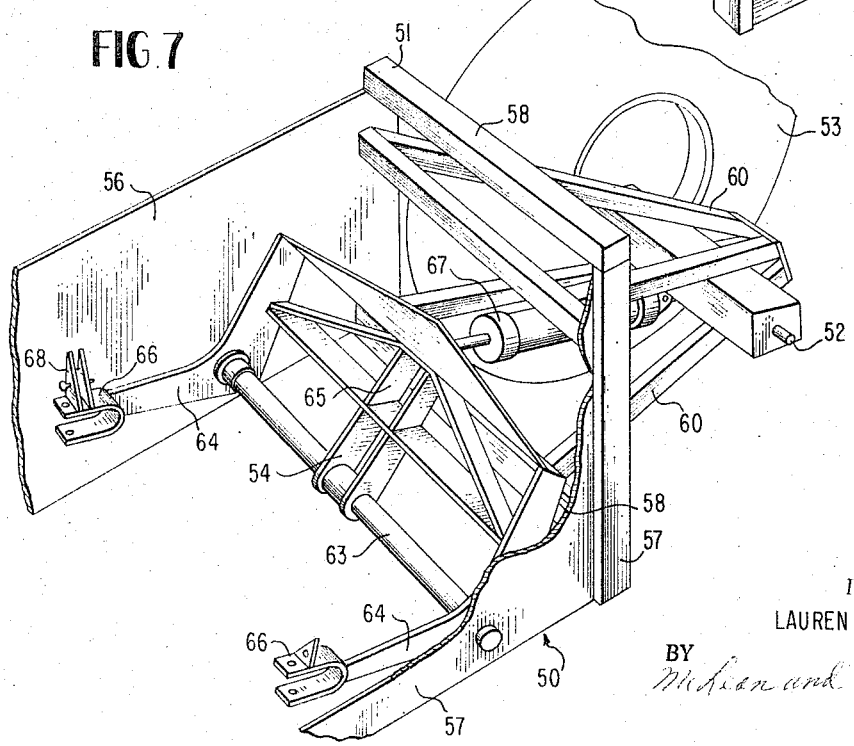

Feb. 28, 1967   L. G. KILMER   3,306,392
HYDRAULIC SYSTEM FOR SEISMIC CARRIER VEHICLE
Filed June 8, 1964   5 Sheets-Sheet 4

INVENTOR.
LAUREN G. KILMER
BY
*McKean and Boustead*
ATTORNEYS

INVENTOR.
LAUREN G. KILMER
BY
McLean and Boustead
ATTORNEYS

United States Patent Office 3,306,392
Patented Feb. 28, 1967

3,306,392
HYDRAULIC SYSTEM FOR SEISMIC
CARRIER VEHICLE
Lauren G. Kilmer, Tulsa, Okla., assignor to Sinclair Research, Inc., New York, N.Y., a corporation of Delaware
Filed June 8, 1964, Ser. No. 373,277
10 Claims. (Cl. 181—.5)

The present invention relates to seismic prospecting and is directed to the rapid generation of seismic waves at spaced points along a traverse line by devices for converting external energy at the earth-air interface into seismic energy, which require the superposition of substantial mass for efficient coupling with the ground, as, for example, gas exploders and mechanical vibrators. More particularly, this invention provides a hydraulic system whereby the required substantial mass may be quickly raised and lowered so as to reduce the time required for movement between the spaced points.

In the devices employed in seismic prospecting with with which the present invention is concerned, the seismic wave is initiated by a pulse, i.e. compressional wave at the surface of the earth generated by a device resting on the ground. It is evident that the device producing the pulse must be properly coupled with the earth in order to obtain maximum conversion of the energy released by the device into seismic energy. Generally the devices which are used at this time are not readily transportable and require reasonably heavy moving equipment in order that they can be moved from place to place. A device, the mass of which can be utilized to aid in the coupling of the seismic wave generator with the earth and at the same time which can serve as a vehicle for transporting the generator from station to station during periods of use and across both rough terrain and on the highway from one point of use to another, is described in copending Kilmer application Serial No. 321,743, filed November 6, 1963, and entitled, Apparatus.

In accordance with the present invention a hydraulic system for the device of the noted copending application is provided in which maximum efficiency and speed in utilization of the device are achieved. The hydraulic system of the present invention allows such a device to be rapidly moved from point to point during use and to be rapidly positioned for transfer between its position when in use and its position for transportation.

The vehicle described in the above copending application Serial No. 321,743 normally carries a seismic wave generator housed within the vehicle raised above the ground between the forward and rear axles to permit clearance as the generator is moved from point of use to another. The emplacement of the device for "firing" is accomplished in two motions, the first requiring the lowering of the generator within the vehicle to a position resting on the ground and the second requiring the raising of the rear wheels of the vehicle to place the bulk of the weight of the vehicle on the generator. In normal usage the generator is utilized to generate seismic waves at a number of times at closely spaced positions in a given general location, thus requiring movement of the generator short distances between each "shot." It has now been found in accordance with the present invention that a substantial saving in the time required for "shots" at such a general location can be made by combining the two motions of the vehicle required to move the generator from its transporting position to its "firing" position such that these motions occur simultaneously and with only one movement of the operator.

For a more complete understanding of the practical application of my invention reference is made to the appended drawings in which:

FIGURE 3 is a fragmentary perspective view of a portion of the vehicle shown in FIGURES 1 and 2;

FIGURE 4 is another fragmentary perspective view of another portion of the vehicle shown in FIGURES 1 and 2;

FIGURE 5 is a further fragmentary perspective view of still another portion of the vehicle shown in FIGURES 1 and 2;

FIGURE 6 is a fragmentary perspective view of the same portion of the vehicle seen in FIGURE 5 but from a different angle of sight;

FIGURE 7 is yet a further fragmentary perspective view of another portion of the vehicle shown in FIGURES 1 and 2;

Figure 1:
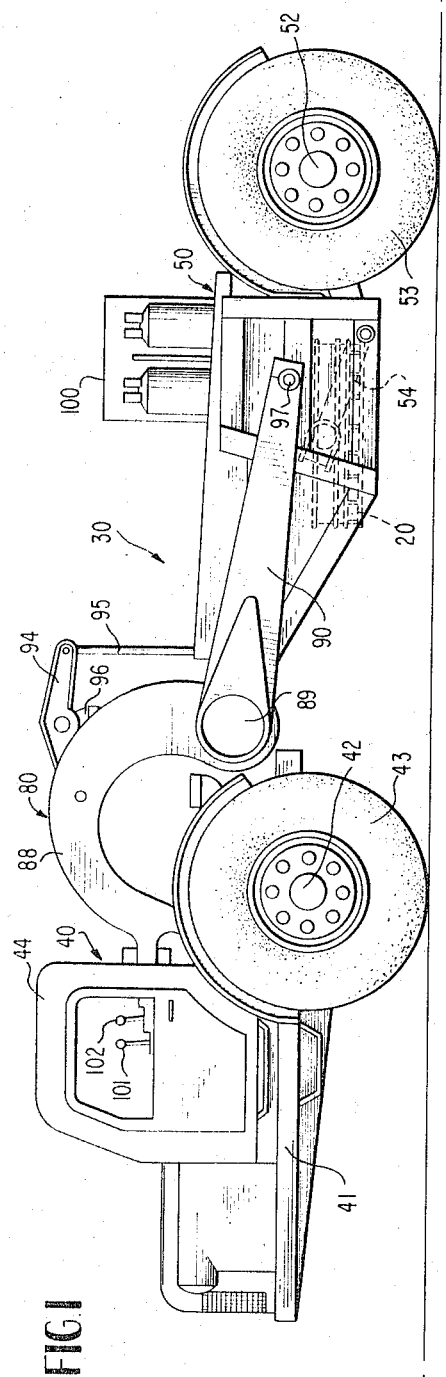
FIGURE 1 is a side elevation of a seismic wave generator being transported by a wheeled vehicle in accordance with my invention.
Figure 2:
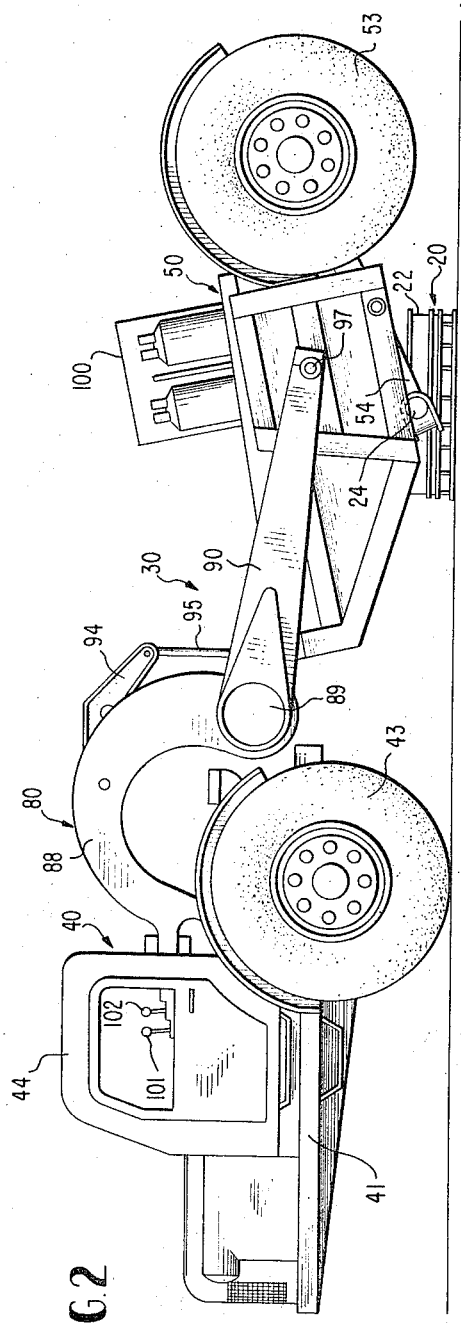
FIGURE 2 is a view similar to FIGURE 1 showing the seismic wave generator in operating position in which the mass of the vehicle is superposed on the generator to couple it with the ground.

Referring more particularly to FIGURES 1 and 2 the reference number 20 designates a seismic wave generator, while the numeral 30 designates a four wheeled vehicle intended, as shown in FIGURE 1, to transport seismic wave generator 20 from place to place and, as shown in FIGURE 2, to superpose a substantial portion of its mass on generator 20 when the latter is used to initiate a seismic wave.

Although the specific construction of generator 20 forms no part of my present invention, and generator 20 can be any suitable gas exploder, mechanical vibrator or other seismic wave generator requiring a substantial mass resting on it for proper coupling with the earth, the illustrated generator 20 is the specific gas exploder described in more detail in my copending application Serial No. 314,230, filed October 7, 1963, which is designed to receive an explosive charge of gases, such as a stoichiometric mixture of oxygen and propylene and to ignite such charge, confining the resultant explosion in a manner such that a substantial part of the force of the explosion is converted into seismic energy.

Vehicle 30 is designed to impose such a weight on generator 20, as illustrated in FIGURE 2, and to this end generator 20, which has a low generally cylindrical construction, is provided with a pair of short horizontal stub shafts 24 which project outwardly from top 22 of generator 20 diagonally opposite each other. Thus any forked device arranged to receive the pair of shafts 24 while clearing the remaining structure of generator 20 can be utilized to pick generator 20 up from the ground or to impose a downward force on generator 20, such force being exerted on top 22 of generator 20.

Basically vehicle 30 includes a forward tractor 40 and a rear carrier 50 which are interconnected by a hitch 80.

Tractor 40 includes a horizontal frame, i.e. carrying on its underside an axle 42 on the ends of which are mounted a pair of wheels 43 positioned on opposite sides of bed 41. Axle 42 is suitably provided with reduction gearing in its connections with wheels 43, steering brakes for each wheel 43 independent of those for the other wheel 43 and a differential connection to an engine mounted on the forward portion of bed 41, positioned to the left of wheels 43 in FIGURES 1 and 2. Cab 44 can be provided on bed 41 for enclosing the operating controls, including valve handles 101 and 102 for the hydraulic system, and the operator. Bed 41 further carries suitable hydraulic pumps, accumulators and the like, as described hereinafter, to permit operation of the various components of vehicle 30 later described. Bed 41 as described more specifically with reference to FIGURE 3 is suitably constructed at its rear over axle 42 to receive hitch 80.

Carrier 50 has a rigid frame 51 constructed of channels and plates, as more specifically described with reference to FIGURES 5-8, and a pair of stub axles 52 laterally mounted on opposite sides of frame 51 adjacent the rear of carrier 50, and carrying a pair of wheels 53 disposed on opposite sides of frame 51. Forwardly of wheels 53 the underside of carrier 50 is open at its front end and frame 51 is free of any cross obstructions interfering with such opening except on the upper portion of frame 51 such that frame 51 forms a box-like structure, having only side walls and cross members at its rear and top, in which a generator support fork 54 is mounted.

Referring more particularly to FIGURES 5 and 6, the forward portion of frame 51 includes a pair of vertical side plates 56 which extend lengthwise and are positioned parallel to each other to define the opposite sides of the forward portion of carrier 50. Plates 56 are preferably reinforced exteriorly by the employment of channels 57 welded to plates 56 with their open sides toward plates 56. Plates 56 are held in parallel relationship by means of heavy cross beams 58 extending between the forward upper corners of plates 56 and across the upper and lower of rear corners of plates 56. Generally the forward lower corner of each plate 56 is cut-off as indicated by the reference number 59.

The rear portion of frame 51 is generally defined by four beams 60 (see particularly FIGURES 7 and 8) a pair of which are secured at their forward ends near the outer ends of a beam 58 joining the upper rear corners of plates 56 and the other pair of which are secured at their forward ends close to the ends of a beam 58 joining the lower rear corners of plates 56. The rear ends of beams 60 are brought together and secured in a rectangular plate 61 and retain between them a horizontally positioned axle box 62 located just forward of plate 61. Stub axles 52 referred to above are mounted on opposite ends of axle box 62.

Referring to FIGURES 6 and 7 fork 54 is mounted on a shaft 63 journaled for rotation at its opposite ends in plates 56 near their lower rear corners just forward of the beam 58 joining such corners, such that shaft 63 extends horizontally across the lower rear portion of the enclosure formed by plates 56 forward of wheel 53. Fork 54 is composed of a pair of cranks 64 the centers of which are affixed to opposite ends of shaft 63 to rotate with shaft 63. Cranks 64 are aligned relative to each other and are joined at their ends which extend upwardly between plates 56 by a framework 65 also secured to shaft 63 such that the entire assembly of fork 54 can move as a unit about the axis of shaft 63. The forward arm of each crank 64 extends closely adjacent the inside of a plate 56 and terminates at its forward end in a clevis 66.

A double acting jack 67 (see FIGURES 7 and 8) which forms a part of the hydraulic system discussed in detail below is pivotally secured at its rear end to framework 51 beneath axle box 61 and is pivotally secured at its forward end to the center of framework 65 at a point remote from shaft 63. The disposition of jack 67 is such that it can be extended by the introduction of a pressure fluid, e.g. hydraulic fluid, at its rear end to a position in which the upper portion of framework 65 is moved forward thereby lowering the forward ends of cranks 64 and hence dropping clevises 66 downwardly through the opening defined in the underside of carrier 50 between side plates 56. When jack 67 is retracted by the introduction of a pressure fluid, e.g. hydaulic fluid, at its front end, the forward ends of cranks 64 are raised up between side plates 56. Because of the proximity of cranks 64 to side plates 56 suitable fastening arrangements can be provided, such as indicated by the reference number 68, for pinning each clevis 66 to the side of the adjacent side plate 56 in order to prevent accidental lowering of fork 54, for example when travelling on the highway.

Referring to FIGURES 1 and 2 hitch 80 is mounted on bed 41 of tractor 40 over axle 42 such that it is free to rotate horizontally on an axis extending lengthwise of and centered between wheels 43 with respect to tractor 40 and through suitable jacks described more specifically with reference to FIGURE 3 can be controlled to rotate about a second axis perpendicular to and intersecting such horizontal axis. Such second axis is normally vertical when wheels 43 and 53 all rest on a common place. Hitch 80 is further secured to frame 51 of carrier 50 at the rear end of hitch 80 such that carrier 50 is free to rotate about a horizontal axis with respect to hitch 80 disposed forward of and parallel to the axial line of wheels 53. Rotation of carrier 50 with respect to hitch 80 about such axis is under the control of jack and lever arrangements described more particularly with reference to FIGURE 3.

More particularly referring to FIGURE 3 and to FIGURE 4, hitch 80 is composed of two principal parts, a pivot base 81 and a yoke 82. Pivot base 81 referring to FIGURE 3 is formed of a heavy beam positioned horizontally above bed 41 over axle 42 and is pivotally mounted on bed 41, as indicated by the reference numbers 83, to permit the above described rotation of hitch 80 about a horizontal axis centrally and longitudinally disposed with respect to tractor 40.

Base 81 at its rear end is slightly elevated and carries a cross member affixed to its which forms a pair of outstanding wings 84, one on each side of the rear end of base 81. At its forward end base 81 is provided with an upright post 85 slightly canted to the rear which at its upper end defines a clevis 86 for receiving a tongue 87 on yoke 82.

Yoke 82 is composed of a pair of arched frame members 88, a cross beam 89 and a pair of side arms 90. Arched frame members 88 are set on an angle, joined together at their forward ends and spread apart at their rearward ends which are secured, spaced apart, on transverse beam 89 to which they are attached. Arms 90 are attached at their forward ends to opposite outer ends of beam 89 and extend downwardly and rearwardly parallel to each other. Arched frame members 88 where they are joined together at their forward ends carry tongue 87 and continue downward together terminating in a post pivotally received in base 81 between post 85 and wings 84 to provide a pivotal connection which is rotatable about a vertical axis when post 85 is in its most upright position and which is vertically aligned with a similar pivot pin joining clevis 86 and tongue 87. Thus yoke 82 can oscillate about an axis which is perpendicular to the horizontal axis of rotation of base 81 on bed 41. The structure is so formed to permit forming more than 90° oscillation of yoke 82 horizontally to either side of base 81 from its normal rearwardly extended position.

A pair of double acting jacks 91, one located on each side of hitch 80, are employed to control the rotational movement of yoke 82 with respect to base 81 as illustrated. Thus a jack 91 is pivotally secured at one end to the outer end of each wing 84 and at its outer end is pivotally secured, as indicated by the reference number 92, to structure secured to the adjacent side of an arch frame member 88 at the forward end of such frame member 88 between the pivotal connection of tongue 87 with post 85 and the pivotal connection of frame members 88 in base 81.

The upper portions of arch frame members 88 where they are spaced from each other intermediate their ends carry between them a horizontal, transversely disposed mounting shaft 93 which is secured at each end in a frame member 88 and thus extends between them. A pair of crank arms 94 are mounted between arch frames 88 with their forward ends rotatably received on shaft 93 and with their rear ends pivotally secured to the upper ends of link rods 95 the lower ends of which are pivotally secured to a cross beam 58 joining the upper forward corners of side plates 56 of carrier 50. The centers of crank arms 94 are located physically between frame members 88 and centrally over beam 89.

A pair of double acting jacks 96, which form a part of the hydraulic system of the present invention, are vertically positioned between beam 89 to which they are pivotally secured at their lower ends and the centers of cranks 94 to which they are pivotally secured at their upper ends. A single jack of suitable size may be used, if desired. Arms 90 extend rearwardly about opposite sides of carrier 50 to which they are secured at their ends remote from beam 89 by pivotal connections 97 mounted in side plates 56 at positions slightly behind the centers of such plates such that pivots 97 are aligned on a horizontal axis extending transversely of carrier 50. It will be apparent, referring particularly to FIGURES 1 and 2, that retraction of jacks 96 by the application of pressure fluid, e.g. hydraulic fluid, at their upper or front ends pulls the centers of cranks 94 downwardly to cause the forward end of carrier 50 to be pushed downwardly relative to beam 89 which is located just forward of the front end of carrier 50. Since arms 90 are rigidly part of hitch 80, the retraction of jacks 96 thus causes carrier 50 to be rotated counter-clockwise, as seen in FIGURES 1 and 2, relative to the transverse horizontal axis on which pivots 97 are located to further load generator 20 and couple the same to the ground.

Figure 9:
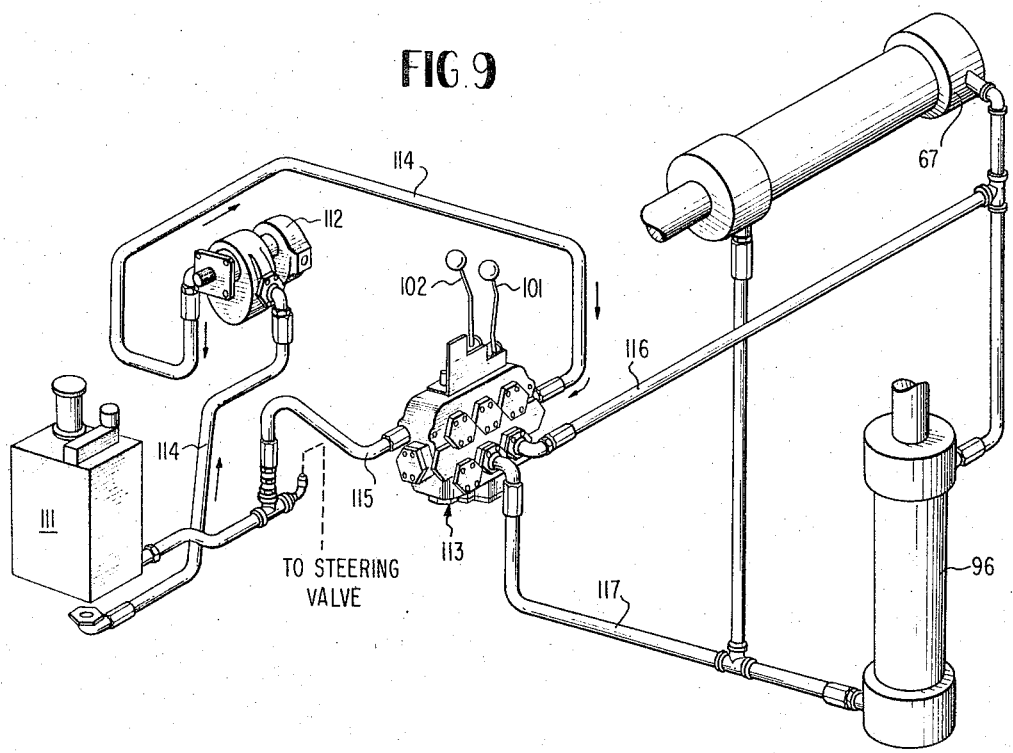
FIGURES 9 is an illustration of the hydraulic system of the vehicle shown in FIGURES 1 and 2.
Figure 8:
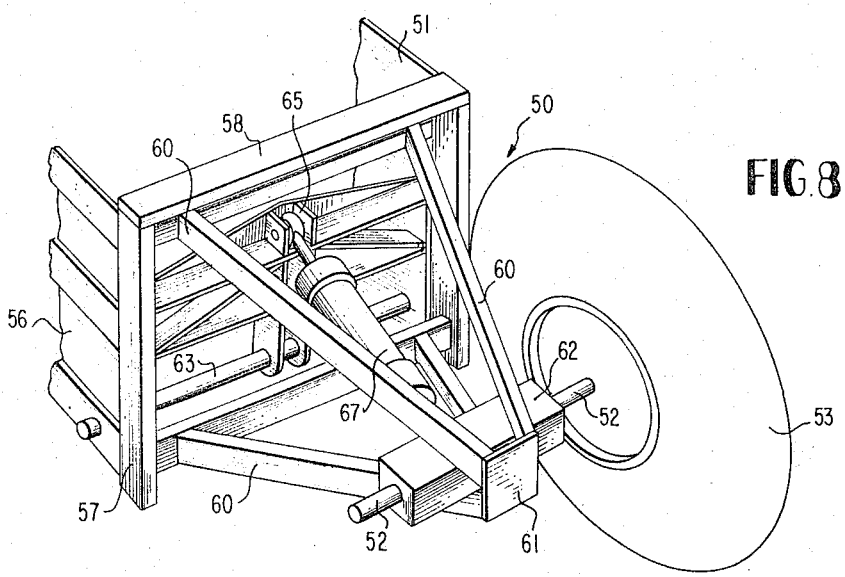
FIGURE 8 is a fragmentary perspective view of the same portion shown in FIGURE 7 but seen from a different angle of sight.
Figure 10:
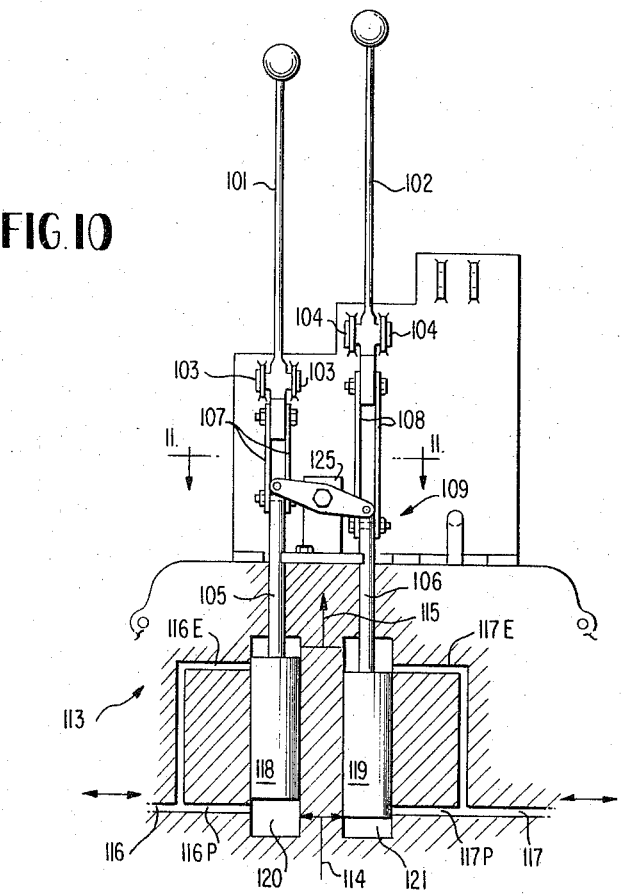
FIGURE 10 is a fragmentary view of the lever arrangement for operating the valves of the hydraulic system shown in FIGURE 5.

Referring now to FIGURES 9 and 10, the double-acting jack 67 for raising and lowering cranks 64 and jacks 96 (only one jack 96 is illustrated in such figures) for raising and lowering cranks 94 are interconnected in a single system for supplying and exhausting presure fluid, e.g. hydraulic fluid, which is operated by a pair of valve levers 101 and 102 connected so as to operate together. The system includes a sump tank 111 for the fluid, a pump 112 and a control valve mechanism 113 interconnected by a supply conduit 114 and an exhaust conduit 115.

Control valve mechanism 113 includes two three-position, two-way valves, e.g. slide valves, which connect the retraction and extension sides of jacks 67 and 96 with the sump tank 111 and pump 112 through conduits 116 and 117 or are maintained in a neutral position whereby jacks 67 and 96 are closed to prevent the supply or exhaust of hydraulic fluid from either side thereof. The three-position valves, as schematically illustrated in FIGURE 10, comprise piston-valve elements 118 and 119 slidable in parallel bores 120 and 121, respectively, formed in the main body of mechanism 113. Pressure conduit 114 carries hydraulic fluid under pressure to one end of both bores 120 and 121 and exhaust conduit 115 is connected to the other end of both bores. Conduits 116 and 117 are connected at the ends thereof opposite jacks 67 and 96, respectively, to bores 120 and 121 adjacent both the connection with pressure conduit 114, i.e. through respective branch conduits 116P and 117P, and the connection with exhaust conduit 115, i.e. through respective branch conduits 116E and 117E.

Valve levers 101 and 102, which in neutral position are approximately vertical in side by side relation, are pivoted near their lower ends on mechanism 113 on horizontal pins 103 and 104, respectively. The lower ends of levers 101 and 102 are horizontal cranks which are connected to valve rods 105 and 106 for valve elements 118 and 119 by links 107 and 108 to which the lower ends of levers 101 and 102 and the upper ends of rods 105 and 106 are respectively pivotally connected. Movement of each lever 101 and 102 away from the vertical in one direction raises and in the other direction lowers its associated valve element 118 and 119 in bores 120 and 121, respectively.

Figure 11:
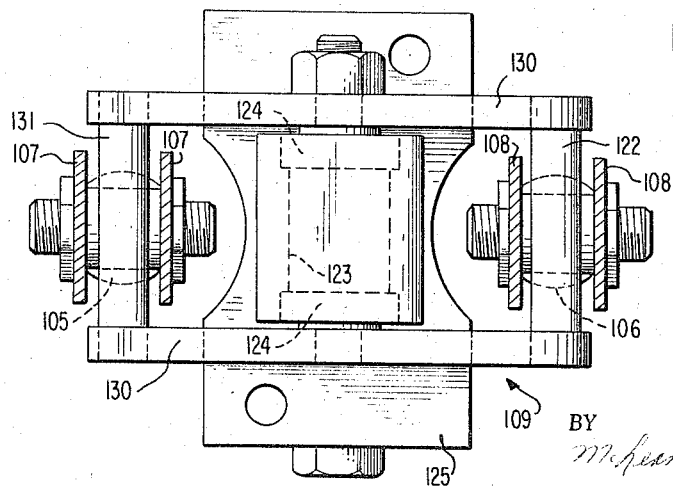
FIGURE 11 is a fragmentary plan view of the lever arrangement shown in FIGURE 10 illustrating the valve actuator bearing spacer.

A walking beam arrangement 109 interconnects the operation of the two levers 101 and 102. As illustrated in FIGURE 11 the walking beam arrangement comprises two plates 130 separated by shafts 131 and 122 which ride, respectively, on the upper portion of rods 105 and 106 between a respective pair of link plates 107 and 108. The plates 130 are pivoted about a shaft 123 which is supported by bearing spacers 124 on support member 125 attached to mechanism 113.

In the arrangement of the present invention it will be noted, referring to FIGURE 9 that jacks 96 and 67 are tied together with the connections from conduit 116 and 117 to jacks 67 and 96 such that their hydraulic operation is in parallel but in reverse directions, that is, when the pressured fluid side is connected to conduit 116 and the exhaust side of the hydraulic system is connected to conduit 117 jack 67 extends and jack 96 retracts while the reverse operation occurs when the connections to the conduits are reversed.

In operation at a site where a seismic wave generator, such as generator 20, is to be used to fire a number of shots, each a position spaced a short distance from the others, generator 20 is retained in fork 54 with stub shafts 24 received in clevises 66. Chocks and pins are used to retain generator 20 in such clevises so that it is free to rotate on shafts 24. Normally its center of gravity is below shafts 24, and hence generator 20 tends to remain right-side up.

It will be apparent referring particularly to FIGURES 1 and 2 that when jacks 96 are extended the forward end of carrier 30 clears the ground between wheels 43 and 53. When jacks 96 are retracted, however, through the operation of cranks 94, the forward end of carriage 30 is lowered relative to hitch 80 about pivots 97. Similarly fork 54, when jack 67 is retracted, raises generator 20 above the ground to a position with its underside above the lower edge of carriage 30. When jack 67 is extended, however, fork 54 lowers generator 20 to a position resting on the ground even when carrier 30 is in its normal position shown in FIGURE 1.

To position the generator 20 for firing, jacks 96 are thus retracted to cause carrier 50 to rotate counter-clockwise, as seen in FIGURE 2, and jack 67 is extended to lower generator 20 to the ground. In the illustrated case the center of gravity of vehicle 30 is forward of the position of generator 20 such counter-clockwise rotation of carrier 50 and lowering of generator 20 lifts wheels 53 from the ground causing the entire weight of the vehicle to be supported on forward wheels 43 and generator 20. Generator 20 is then fired, for example, in the manner described in the above noted copending applications, Serial Nos. 187,111 and 314,230. (In this connection it should be noted that carrier 50 can suitably be employed for housing cylinders of gases used to charge generator 20 which, for example, can be mounted across side plates 56 preferably over the position of generator 20 in order to maximize the weight directly imposed on generator 20. Such a housing for gas storage cylinders is shown in FIGURES 1 and 2 and indicated by the reference numeral 100.)

The hydraulic system of FIGURES 9 and 10 is especially designed for quick and simple, simultaneous raising and lowering of the generator 20 and the parts of the vehicle. In lowering the generator, valve body 118 is raised by pushing lever 101 to connect the pressure conduit 114 with conduit 116P and feed pressure fluid into the rear side of jack 67 to extend the same. Simultaneously with the raising of valve body 118 by lever 101, walking beam 109 presses rod 106 and valve body 119 down to close the connection to pressure conduit 114 and conduit 117P and open conduit 117E to exhaust line 115 to exhaust the front side of jack 67. Furthermore, since conduits 116 and 117 are connected to both jacks 67 and 96, but to opposite sides thereof, jack 96 is simultaneously retracted with the extension of the jack 67. When jack 67 is extended as described above and conduit 116 is connected to pressure conduit 114, jack 96 is retracted since the front or retraction side thereof is also connected to pressure conduit 114. Conduit 117, which is connected to exhaust, is simultaneously and automatically connected to the other or extension side of jack 96.

After firing, generator 20 is raised to a position for transportation to the next firing position by reversing the procedure described above for the lowering thereof. This reversal requires a single movement of the operator, i.e. either to pull the lever 101 or push lever 102 to connect conduit 117 with pressure conduit 114 and conduit 116 with exhaust conduit to extend jack 96 and retract jack 67, since movement of one lever automatically forces the other lever to perform the desired motion. Jacks 67 and 96 thereby raise the generator 20.

The device of the present invention is very advantageous and provides for very rapid operation of the device since the operator is required to make only a single movement and in each case the movement is to either push or pull a single lever. Also, although the pair of levers are arranged in a side-by-side relationship, the two levers are separated by a relatively wide arc since movement of a lever in one direction causes movement of the other lever in the opposite direction. Accordingly, the operator of the device cannot inadvertently raise or lower the device in error. Also, a considerable savings of time between shots is experienced with the present invention over the known devices. Using the generator of applicant's copending application 314,230, it is possible for a crew of one operating the device to ready it for firing a shot approximately every 15 seconds and movement between locations requires only a matter of a few minutes.

I claim:

1. In the combination of a pulse type seismic wave generator and a vehicle for superposition thereon including first support wheel means on said vehicle, second support wheel means on said vehicle, generator support means mounted on said vehicle engaging said generator and mounted for movement between positions in which said generator is relatively lower and relatively higher on said vehicle, means on said vehicle attached to said generator support means for moving said generator to said positions, and means on said vehicle for raising and lowering said second support wheel means relative to said first support wheel means, whereby when said generator is moved to a said lower position and said second support wheel means is raised the mass of said vehicle is supported on said first wheel means and on said generator, the improvement of operator means operably connected to said means for moving said generator support means and to said means for raising and lowering said second support wheel means whereby said generator is lowered relative to said vehicle and said second support wheel means is raised relative to said first support wheel means simultaneously in one position of said operator means and whereby said generator is raised relative to said vehicle and said second support wheel means is lowered relative to said first wheel support means simultaneously in a second position of said operator means, said means attached to said generator support means including first double-acting jack means extendable to lower said generator and retractable to raise said generator and said means for raising and lowering said second wheel support means including second double-acting jack means retractable to raise said second support wheel means and extendable to lower said second support wheel means, and said operator means including first two-way valve means, second two-way valve means, each said valve means including a first conduit connected thereto, a second conduit connected thereto and a third conduit connected thereto and being operable to a first position interconnecting the first and third conduits connected thereto and to a second position interconnecting the first and second conduits connected thereto, means for connecting said valves to a source of pressure fluid including a pressure conduit connected to said third conduits connected to each said valve means and an exhaust conduit connected to said second conduits connected to each said valve means, means interconnecting the retraction side of the said first jack means, the extension side of said second jack means and said first conduit connected to said first valve means, means interconnecting the extension side of said first jack means, the retraction side of said second jack means and said first conduit connected to said second valve means, said first and second valve means being in said first and second positions thereof, respectively, in said one position of said operator means, and said first and second valves means being in said second and first positions thereof, respectively, in said second position of said operator means.

2. The improvement according to claim 1 wherein each of said two-way valve means includes a three-position slide valve having a third, neutral position in which neither of said first, second and third conduits connected thereto are interconnected.

3. The improvement according to claim 1 in which said operator means further includes a first pivotally secured lever operatively connected to operate said first two-way valve means, a second pivotally secured lever positioned alongside said first lever and operatively connected to operate said second two-way valve means, and means interconnecting said first and second levers whereby when either said lever is moved to a position operating the valve associated therewith to either said first or said second position thereof, said interconnecting means operates the other said lever to the position thereof, operating the valve associated therewith respectively to the second or first position thereof.

4. The improvemnet according to claim 3 wherein said means interconnecting said levers includes a walking beam.

5. The improvement according to claim 3 wherein said means interconnecting said levers upon pivotal movement of one of said levers in one direction moves the other of said levers in the opposite direction.

6. The improvement according to claim 5 wherein said means for interconnecting said levers is a walking beam.

7. The improvement according to claim 6 further including a stationary part, each said lever being pivotally mounted intermediate the ends thereof on said part, one end of each said lever being operatively connected to the valve means associated therewith by a pair of link plates and a valve rod, each said pair of link plates being pivotally mounted to said one of a respective one of said levers and to a respective one of said valve rods, and wherein said walking beam is operatively connected to both said valve rods.

8. The improvement according to claim 7 wherein said walking beam comprises a pair of plates and a pair of shafts separating said last-mentioned link plates being pivotally mounted on said stationary part intermediate the ends thereof, each said shaft resting on a respective one of said valve rods between the pair of plates attached thereto.

9. The improvement according to claim 8 wherein said first and second valve means are each three-position valves having a third, neutral position wherein neither of said first, second and third conduits connected thereto are interconnected.

10. The improvement according to claim 9 wherein said first and second valve means are slide valves.

References Cited by the Examiner
UNITED STATES PATENTS

| | | | |
|---|---|---|---|
| 2,523,572 | 9/1950 | Jansson | 91—413 X |
| 2,581,303 | 1/1952 | Siimes | 91—413 X |
| 2,595,486 | 5/1952 | Rosenberg | 91—413 X |
| 3,106,982 | 10/1963 | Wade | 181—.5 |

BENJAMIN A. BORCHELT, *Primary Examiner.*

G. H. GLANZMAN, *Assistant Examiner.*